(12) United States Patent
Zhang

(10) Patent No.: US 10,691,310 B2
(45) Date of Patent: Jun. 23, 2020

(54) COPYING/PASTING ITEMS IN A VIRTUAL DESKTOP INFRASTRUCTURE (VDI) ENVIRONMENT

(71) Applicant: VMware, Inc., Palo Alto, CA (US)

(72) Inventor: Lizhu Zhang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 444 days.

(21) Appl. No.: 14/040,494

(22) Filed: Sep. 27, 2013

(65) Prior Publication Data

US 2015/0095795 A1 Apr. 2, 2015

(51) Int. Cl.

| G06F 3/0486 | (2013.01) |
| --- | --- |
| G06F 3/0484 | (2013.01) |
| G06F 9/451 | (2018.01) |
| G06F 9/455 | (2018.01) |
| G06F 9/54 | (2006.01) |
| H04L 29/08 | (2006.01) |

(52) U.S. Cl.
CPC ............ G06F 3/0484 (2013.01); G06F 9/452 (2018.02); G06F 9/45558 (2013.01); G06F 9/543 (2013.01); H04L 67/2809 (2013.01)

(58) Field of Classification Search
CPC ............................... G06F 3/0486; G06F 9/543
USPC .................................................. 715/769–770
See application file for complete search history.

(56) References Cited

U.S. PATENT DOCUMENTS

| 6,463,460 | B1* | 10/2002 | Simonoff ...................... 709/203 |
| 8,122,122 | B1* | 2/2012 | Clingenpeel et al. ........ 709/224 |
| 2005/0102670 | A1* | 5/2005 | Bretl .......................... G06F 9/544 718/1 |
| 2005/0268047 | A1* | 12/2005 | Aslot .................. G06F 12/1072 711/147 |
| 2007/0204166 | A1* | 8/2007 | Tome .................. H04L 63/0272 713/182 |
| 2010/0223613 | A1* | 9/2010 | Schneider ........... G06F 9/45558 718/1 |
| 2010/0306264 | A1* | 12/2010 | Fletcher et al. .............. 707/776 |
| 2012/0110470 | A1* | 5/2012 | Mistry et al. ................. 715/748 |
| 2012/0317112 | A1* | 12/2012 | Naito ........................... 707/737 |
| 2012/0331032 | A1* | 12/2012 | Balachandran et al. ...... 709/202 |
| 2013/0151484 | A1* | 6/2013 | Kruglick ....................... 707/692 |
| 2013/0298210 | A1* | 11/2013 | Wright et al. .................... 726/7 |
| 2014/0090016 | A1* | 3/2014 | Kruglick ........................... 726/3 |
| 2014/0108506 | A1* | 4/2014 | Borzycki ............ H04L 67/1095 709/203 |

OTHER PUBLICATIONS https://www.stardock.com/products/multiplicity/; 2019 (Year: 2019).*
https://web.archive.org/web/20120111140508/https://www.stardock.com/products/multiplicity/; Jan. 11, 2012; pp. 1-22 (Year: 2012).*

* cited by examiner

Primary Examiner — Sherief Badawi
Assistant Examiner — Lê Nguyen

(57) ABSTRACT

In a computer-implemented method for copying/pasting items in a virtual desktop infrastructure (VDI) environment a request is received to copy an item from a first virtual machine and paste the item to a second virtual machine. A unique identifier of the item is generated. An indication is received at the second virtual machine, from a communication broker, that the item is at the first virtual machine. The item is received at the second virtual machine directly from the first virtual machine.

15 Claims, 6 Drawing Sheets

COPYING/PASTING ITEMS IN A VIRTUAL DESKTOP INFRASTRUCTURE (VDI) ENVIRONMENT

BACKGROUND

In a Virtual Desktop Infrastructure (VDI) environment, virtual machines may be accessed by a remote device over a network, such as the Internet.

In order to copy data from a first virtual machine and paste the data to a second virtual machine, the data is conventionally transmitted from the first virtual machine to the remote device over the Internet and from the remote device to the second virtual machine over the Internet.

The transmission of the data over the Internet between the remote device and the virtual machines may be limited (e.g., low bandwidth) and therefore negatively affect the transmission rate of the data to and from the remote device.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
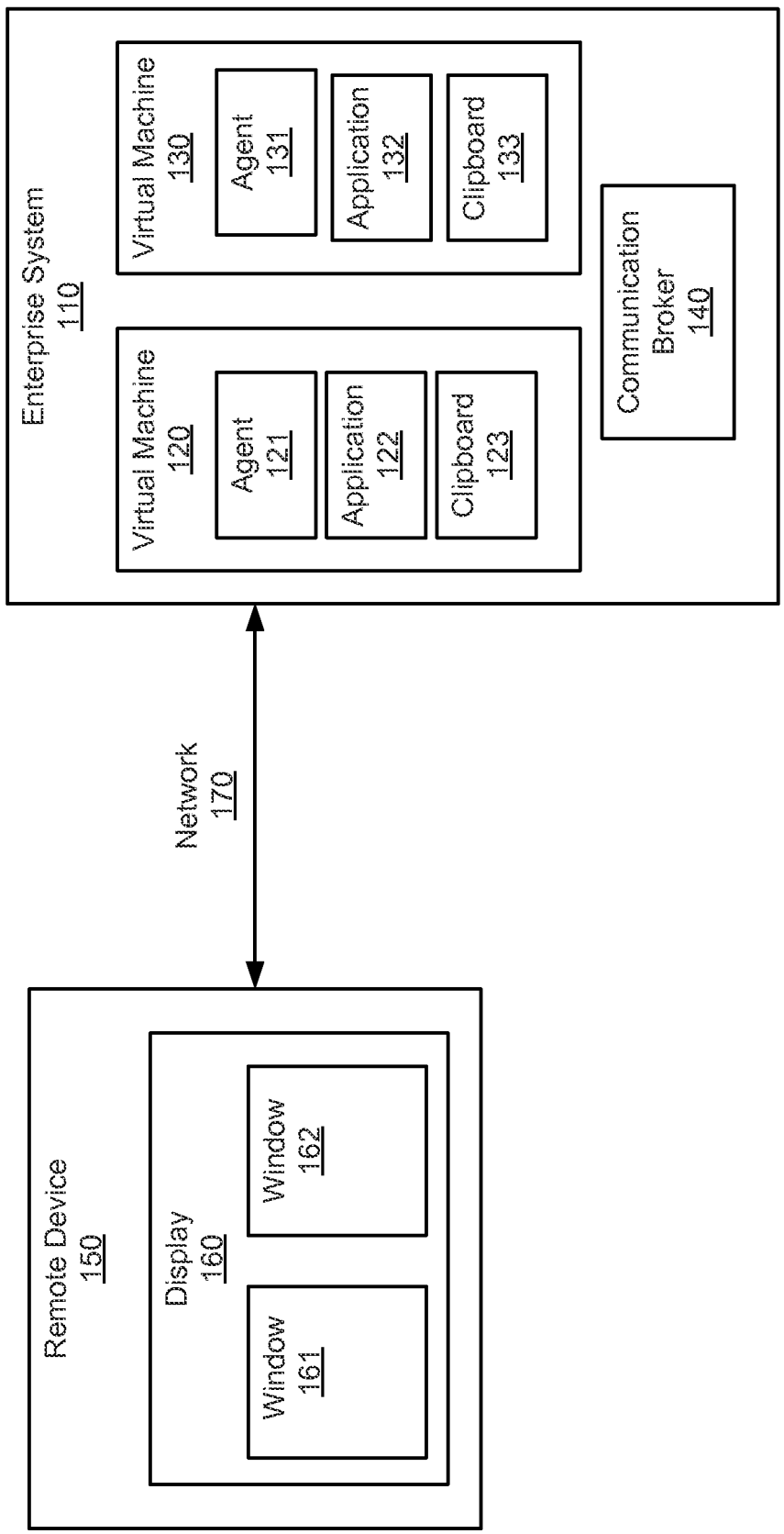
FIG. 1 is a block diagram that illustrates an embodiment of an enterprise system.

FIG. 1 depicts a block diagram that illustrates enterprise system 110, according to various embodiments. In general, enterprise system 110 is a corporate system or network that includes a combination of computer hardware and software. The corporation or enterprise utilizes the combination of hardware and software to organize and run its operations. For example, an enterprise system may provide various computing resource for various needs such as, but not limited to information technology (IT), security, email, etc.

In various embodiments, enterprise system 110 includes a plurality of devices. The devices are any number of physical and/or virtual machines (e.g., virtual machine 120 and 130). For example, in one embodiment, enterprise system 110 is a corporate computing environment that includes tens of thousands of physical and/or virtual machines. It is understood that a virtual machine is implemented on one or some combination of physical computing machines.

The physical and/or virtual machines include a variety of applications (e.g., operating system, word processing, etc.). The physical and/or virtual machines may have the same installed applications or may have different installed applications or software. The installed software may be one or more software applications from one or more vendors.

The virtual machines may include a guest operating system. The guest operating system may be a commodity operating system or a specialized operating system (sometimes referred to as a "paravirtualized OS") designed specifically to work with virtualization software (e.g., a hypervisor), which is described in further detail below.

In various embodiments, enterprise system 110 may be a cloud environment. Enterprise system 110 may be located in an Internet connected data center or a private cloud computing center coupled with one or more public and/or private networks. Enterprise system 110, in one embodiment, typically couples with a virtual or physical entity in a computing environment through a network connection which may be a public network connection, private network connection, or some combination thereof. For example, a user may couple via an Internet connection with enterprise system 110 by accessing a web page or application presented by enterprise system 110 at a virtual or physical entity.

Enterprise system 110 may include an authorization server and/or a resource server. An authorization server provides authorization functionality such as authorizing remote devices to communicate with enterprise system 110 and a resource server provides access to enterprise resources such as providing access to particular resources and applications of enterprise system 110.

In various embodiments, remote device 150 is registered with enterprise system 110 such that it is able to access various resources controlled by enterprise system 110. Remote device 150 can be, but is not limited to, a smart phone, computer tablet, personal digital assistant (PDA), desktop computer, thin client, thick client, etc.

For example, a user of remote device 150 may be an employee of a corporation that utilizes and controls enterprise system 110. Typically, the user accesses the corporate resources via applications installed on registered/authorized devices within the corporate domain or firewall. In general, a firewall facilitates in securing enterprise system 110. The firewall controls the incoming and outgoing network traffic, for example, by analyzing the data packets and determining whether the traffic should be allowed through the firewall.

However, employees of the enterprise or users of enterprise system 110 may desire to utilize remote devices to access enterprise resources. For example, a user desires to access resources from remote device 150 because the user is at home and unable to access the resources via a device within the firewall. In another example, the user desires to utilize their own personal mobile device to access resources rather than from a desktop computer within the companies firewall.

Remote device 150 accesses resources in enterprise system 110 through a virtual desktop infrastructure (VDI)

environment. In general, a VDI uses communication broker 140 to connect users to their assigned desktop sessions. As a result, in one example, users can access their desktop from any location, without being tied to a single client device. Since the resources are centralized, users moving between work locations can still access the same desktop environment with their applications and data.

Remote device 150 includes connection software that facilitates in remote device 150 accessing resources (e.g., desktops, virtual machines, applications, etc.) of enterprise system 110. For example, the connection software allows the user to connect to their assigned desktop session from various locations.

Display 160 displays window 161 and window 162. In one embodiment, window 161 is associated with virtual machine 120 and window 162 is associated with virtual machine 130.

In particular, window 161 displays applications (e.g., application 122) running on virtual machine 120 and window 162 displays applications (e.g., application 132) running on virtual machine 130.

As will be described in further detail below, contents (e.g., data, text, file, etc.) associated with a first virtual machine are able to be copied and subsequently pasted to a second virtual machine without requiring the contents to be transmitted to and from remote device 150 over network 170 (e.g., Internet). In other words, items may be copied and pasted locally within enterprise system 110 in response to user input at remote device 150.

Example Methods of Operation

The following discussion sets forth in detail the operation of some example methods of operation of embodiments. With reference to FIGS. 2, 3A, 3B and 4, flow diagrams 200, 300, and 400 illustrate example procedures used by various embodiments. Flow diagrams 200-400 include some procedures that, in various embodiments, are carried out by a processor under the control of computer-readable and computer-executable instructions. In this fashion, procedures described herein and in conjunction with flow diagrams 200, 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., remote device 150) and/or cloud environments (e.g. enterprise system 110). The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 200, 300 and/or 400, such procedures are examples. That is, embodiments are well suited to performing various other procedures or variations of the procedures recited in flow diagrams 200, 300 and/or 400. Likewise, in some embodiments, the procedures in flow diagrams 200, 300 and/or 400 may be performed in an order different than presented and/or not all of the procedures described in one or more of these flow diagrams may be performed. It is further appreciated that procedures described in flow diagrams 200, 300 and/or 400 may be implemented in hardware, or a combination of hardware with firmware and/or software.

Figure 2:
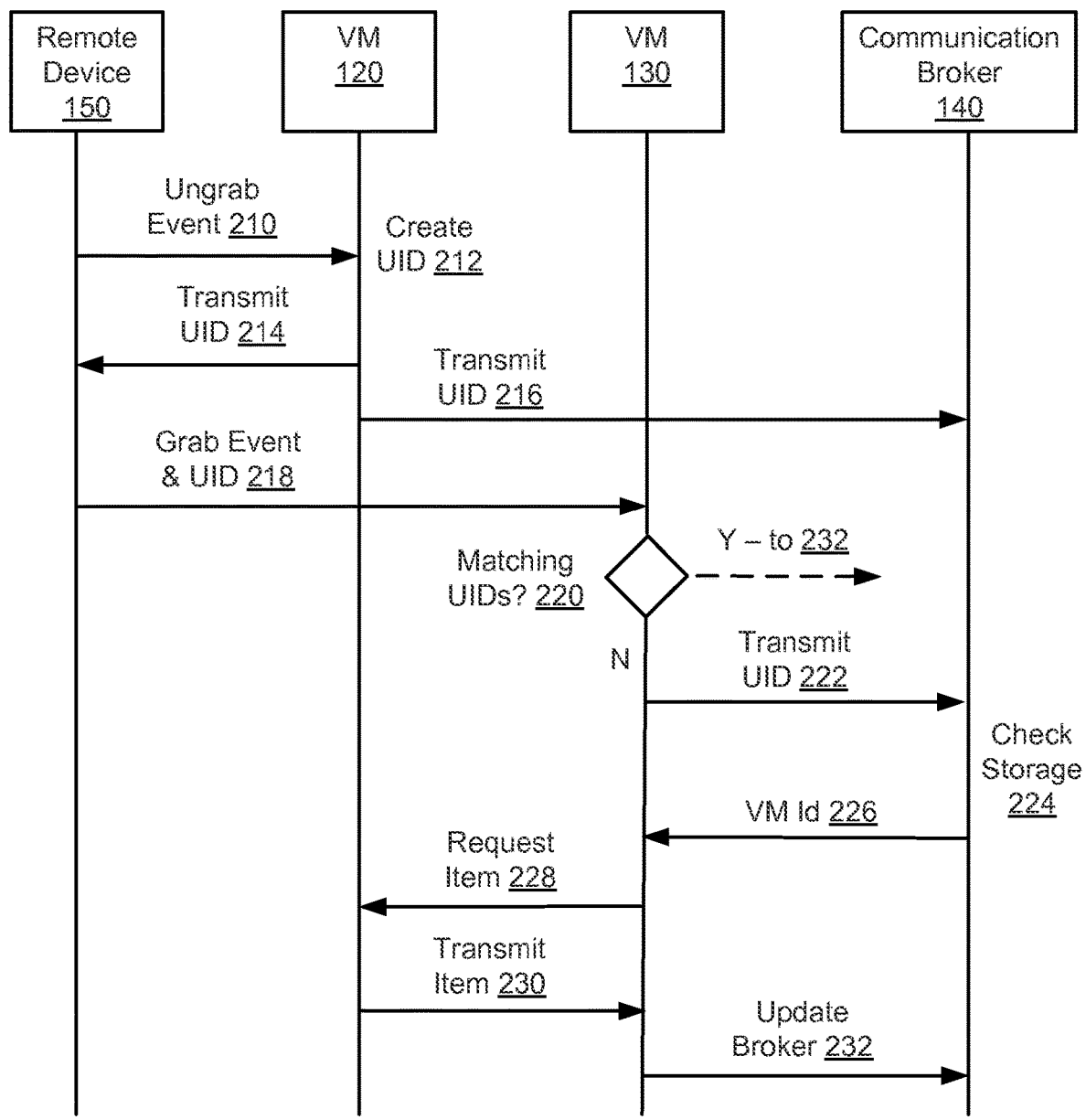
FIG. 2 depicts a process flow diagram for copying/pasting items in a VDI environment, according to various embodiments.

FIG. 2 depicts a process flow diagram for copying/pasting items in a VDI environment, according to various embodiments.

At 210, an ungrab event occurs at remote device 150. For example, window 161 provides a user access to application 122 (e.g., a word processing application) executed by virtual machine 120 and window 162 provides the user access to application 132 (e.g., an email application) executed by virtual machine 130.

The user desires to copy an item (e.g., text, data, file, etc.) from application 122 (accessed in window 161) and paste the item to application 132 (accessed in window 162).

In particular, the user selects the item, for example, via a cursor, to be copied. The ungrab event is when the cursor exits window 161 for subsequent pasting of the item in window 162.

In one embodiment, the ungrab event occurs when the cursor exits the window as the user is dragging an item (e.g., text) out of the window while holding down a mouse button. In another embodiment, the ungrab event occurs when the cursor merely exits the window (where the item to be copied is located).

In one embodiment, an item associated with virtual machine 120 that is selected to be copied is placed into clipboard 123.

At 212, a unique identifier (UID) for the selected item to be copied is generated. For example, in response to the ungrab event at 210, agent 121 generates a UID for the item or contents that are located in clipboard 123.

The UID is any unique identifier that uniquely identifies the contents selected to be copied. The UID, in one embodiment, identifies the virtual machine associated with the selected contents. In one embodiment, the UID is a hash value.

At 214, the UID is transmitted to remote device 150. For example, agent 121 transmits the UID of the selected contents in clipboard 123 to remote device 150 where it is stored.

At 216, the UID is transmitted to communication broker 140. For example, agent 121 transmits the UID of the selected contents in clipboard 123 to communication broker 140 where it is stored. Also, the identification of the associated virtual machine (e.g., virtual machine 120) is also transmitted to and stored at communication broker 140. It should be appreciated that the UID and the virtual machine identification are mapped together at communication broker 140.

In one embodiment, step 214 and step 216 occur simultaneously.

At 218, a grab event occurs at remote device 150 and the UID is transmitted to virtual machine 130. For example, the cursor enters window 162 to paste the selected item into window 162. More specifically, a user selects and copies text from application 122 displayed in window 161 and moves the cursor into window 162 for pasting of the text into application 132.

The moving of the cursor into window 162 is a grab event.

In one embodiment, the grab event is when the user drags the text and drops it into the window (i.e., the user releases the mouse button). In another embodiment, the grab event occurs merely when the cursor enters the window (where the item is intended to be pasted).

In response to the grab event, the UID stored at remote device 150 is transmitted to virtual machine 130 that is associated with window 162.

At 220, agent 131 of virtual machine 130 determines if the UID received from remote device 150 matches the UID of the contents in clipboard 133 of virtual machine 130. The UID of the contents in clipboard 133 is the UID of the most recent contents in clipboard 133 (prior to receiving the UID from remote device 150.

If the UIDs are matching, then step 228 occurs, which is described in further detail below. For instance, if the UID of the contents in clipboard 123 matches the UID of the contents in clipboard 133, then the contents of clipboard 123 are also in clipboard 133. As a result, clipboard 133 includes the contents that are selected to be pasted into virtual machine 130 from virtual machine 120.

At 222, if the UIDs are not matching, then virtual machine 130 sends the UID (received at step 218) and queries communication broker 140 to determine if communication broker 140 has the identity of the virtual machine associated with the UID (received at step 218). For example, virtual machine 130 may transmit the UID of the contents of clipboard 123 (received from remote device 150) to communication broker 140.

At 224, communication broker 140 checks its storage of UIDs and associated virtual machines. For example, communication broker 140 receives the UID of the contents of clipboard 123 from virtual machine 130 and determines that the UID received from virtual machine 130 (at step 222) matches the UID received from virtual machine 120 (at step 216).

At 226, the identification of the virtual machine associated with the matching UID is transmitted to virtual machine 130. For example, the identification of virtual machine 120 (associated with the UID of the contents of clipboard 123) is provided to virtual machine 130 because the UID transmitted to communication broker from virtual machine 120 (at step 216) matches the UID transmitted to communication broker 140 from virtual machine 130 (at step 222).

At 228, virtual machine 130 requests the item in clipboard 123. For example, virtual machine 130 requests text that is located in clipboard 123 for subsequent pasting into application 132.

At 230, virtual machine 120 transmits the contents in clipboard 123 (that is selected to be copied and pasted) to virtual machine 130.

As a result, the contents of clipboard 123 are copied from virtual machine 120 and pasted into application 132 of virtual machine 130 without requiring the contents of clipboard being transmitted over network 170 to and from remote device 150. That is, the contents of clipboard 123 are transmitted from virtual machine 120 to virtual machine 130 within enterprise system 110 such that the selected contents for copying/pasting are not transmitted over network 170 between remote device 150 and enterprise system 110.

At 232, the communication broker 140 is updated. For example, the communication broker is informed that the selected contents (formerly in clipboard 123) accessed in virtual machine 120 has been pasted to virtual machine 130.

It is noted that any of the procedures, stated above, regarding flow diagram 200 may be implemented in hardware, or a combination of hardware with firmware and/or software. For example, any of the procedures are implemented by a processor(s) of a cloud environment (e.g., enterprise system 110) and/or a computing environment (e.g., remote device 150.)

Figure 3A:
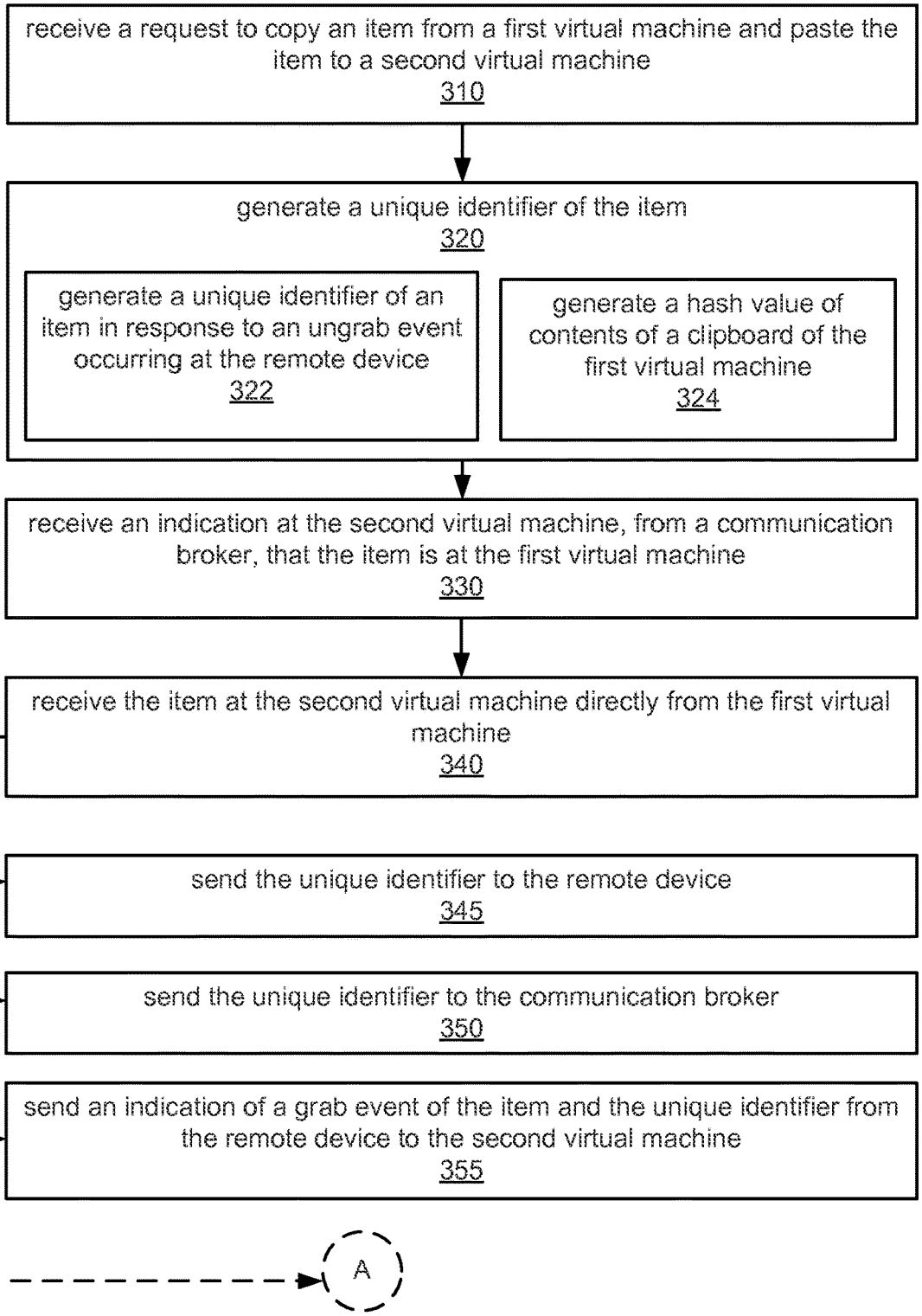
FIGS. 3A-B depict a flow diagram for a method for copying/pasting items in a VDI environment, according to various embodiments.
Figure 3B:
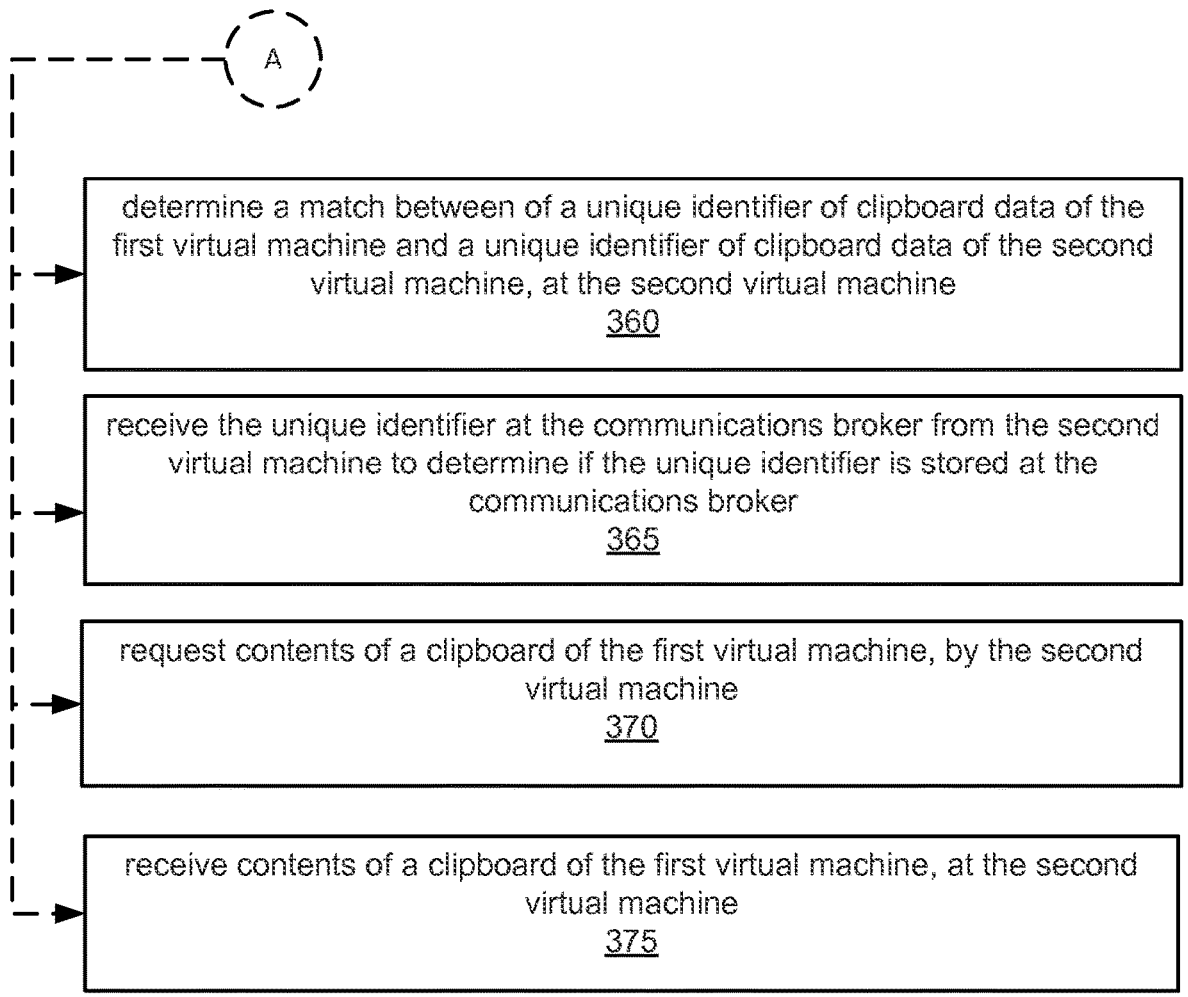

FIGS. 3A-B depict a flow diagram for a method for copying/pasting items in a VDI environment, according to various embodiments.

Referring now to FIGS. 3A-B, at 310, a request is received to copy an item from a first virtual machine and paste the item to a second virtual machine. In various embodiments, the ungrab/grab events for copying/pasting may be, but are not limited to, dragging and dropping text/content between different windows, performing a copy function in one window and performing a subsequent paste operation in another windows, etc.

For example, application 122 (e.g., word processing application) is accessed via window 161 and application 132 (e.g., email application) is accessed via window 162 of remote device 150. Text from application 122 is selected by a cursor and is copied for subsequent pasting for application 132 accessed via window 162.

At 320, a unique identifier of the item is generated. For example, the selected item is placed into clipboard 123, and virtual machine 120 generates a unique identifier of the item.

At 322, in one embodiment, a UID of an item is generated in response to an ungrab event occurring at the remote client. For example, upon selection of the item to be copied within window 161, the cursor exits window 161 (which is an ungrab event) and the selected item is placed into clipboard 123. In response to the ungrab event, virtual machine 120 generates a UID of the item in clipboard 123.

At 324, in one embodiment, a hash value of contents of a clipboard of the first virtual machine is generated. For example, a hash value of the item in clipboard 123 is generated by agent 121 of virtual machine 120.

At 330, an indication is received at the second virtual machine, from a communication broker, that the item is at the first virtual machine. For example, communication broker 140 sends to virtual machine 130 an indication that the UID transmitted to communication broker 140 (at step 222) matches the UID transmitted to communication broker 140 from virtual machine 120 (at step 216).

At 340, the item is received at the second virtual machine directly from the first virtual machine is received. In other words, the second virtual machine is not required to receive the item from the remote device.

For example, the contents selected to be copied from virtual machine 120 and located in clipboard 123, are transmitted directly to virtual machine 130 within enterprise system 110 without being transmitted over network 170.

At 345, in one embodiment, the unique identifier is sent to the remote device. For example, upon agent 121 generating a hash value of the contents in clipboard 123, the hash value is sent from virtual machine 120 over the Internet to remote device 150 where it is stored.

At 350, the unique identifier is sent to the communication broker. For example, upon agent 121 generating a hash value of the contents in clipboard 123, the hash value is sent from virtual machine 120 over the Internet to communication broker 140 where it is stored. Additionally, the identity of the virtual machine associated with the hash value is sent to the communication broker where it is also stored in association with the hash value.

At 355, an indication of a grab event of the item and the unique identifier from the remote device is sent to the second virtual machine. For example, in response to a cursor entering window 162 (e.g., a grab event) with the selected item to be pasted, an indication of the grab event and a hash value of the selected item, that is in clipboard 123, is transmitted to virtual machine 130.

At 360, a match between of a unique identifier of clipboard data of the first virtual machine and a unique identifier of clipboard data of the second virtual machine is determined, at the second virtual machine. For example, upon receiving the hash value of the contents of clipboard 123 from remote device 150, virtual machine 130 compares the hash value of the contents of clipboard 123 with the hash value of the contents of clipboard 133 to determine if they are a match or not.

At 365, the unique identifier is received at the communications broker from the second virtual machine to determine if the unique identifier is stored at the communications broker. For example, virtual machine 130 sends the hash value of the contents of clipboard 123 to communication broker 140 to determine if the hash value is stored (with the associated identity of virtual machine 120) at communication broker 140.

At 370, contents of a clipboard of the first virtual machine are requested by the second virtual machine. For example, in response to communication broker 140 indicating that the contents of clipboard 123 are associated with virtual machine 120, virtual machine 130 requests the contents of clipboard 123 from virtual machine 120.

At 375, receiving contents of a clipboard of the first virtual machine, at the second virtual machine. For example, a paste of the contents clipboard 123 occurs when the contents of clipboard 123 are transmitted to virtual machine 130.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

Figure 4:
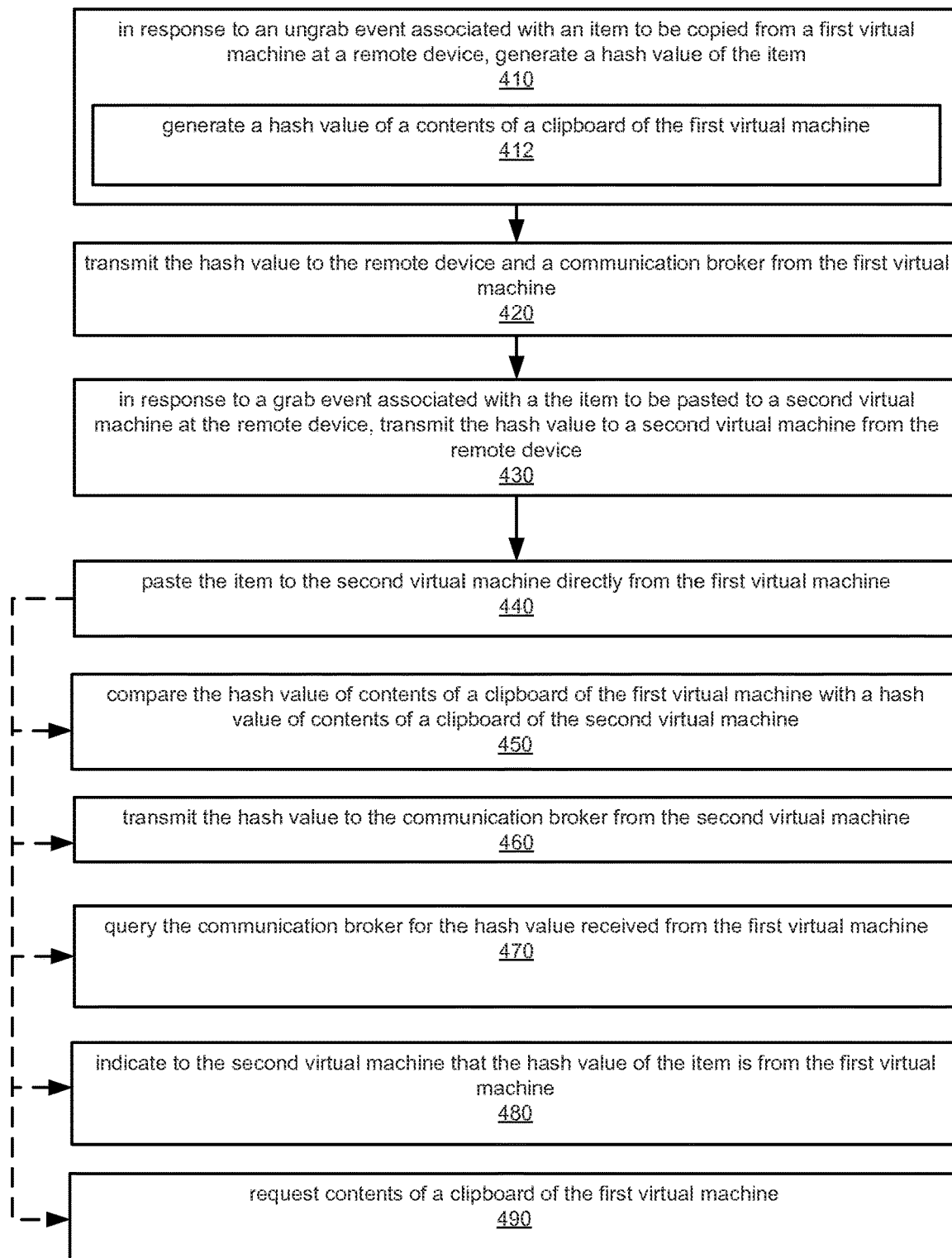
FIG. 4 depicts a flow diagram for a method for copying/pasting items in a VDI environment, according to various embodiments.

FIG. 4 depicts a flow diagram 400 for a method for copying/pasting items in a VDI environment, according to various embodiments.

Referring now to FIG. 4, at 410, in response to an ungrab event associated with an item to be copied from a first virtual machine at a remote device, a hash value of the item is generated.

For example, text from application 122 is selected and copied for subsequent pasting for application 132 accessed via window 162. In response to the cursor exiting window 161 (e.g., ungrab event), virtual machine 120 generates a hash value of the item.

At 412, in one embodiment, the hash value of the contents of a clipboard of the first virtual machine is generated. For example, the selected contents are placed in clipboard 123 and agent 121 generates a hash value of the contents.

At 420, the hash value is transmitted to the remote device and a communication broker from the first virtual machine. Agent 121 transmits the hash value of the contents of clipboard 123 to both remote device 150 and communication broker 140.

At 430, in response to a grab event associated with a the item to be pasted to a second virtual machine at the remote device, the hash value is transmitted to a second virtual machine from the remote device. For example, in response to the cursor entering window 162 (e.g., grab event) for subsequent pasting of the selected contents within window 162, remote device 150 transmits the hash value of the contents in clipboard 123 to virtual machine 130.

At 440, the item is pasted to the second virtual machine directly from the first virtual machine. In other words, the item is not required to pass from the first virtual machine and subsequently to a remote device for pasting at the second virtual machine.

For example, the selected contents are pasted in virtual machine 130 such that the selected contents are transmitted directly from virtual machine 120 to virtual machine 130 within enterprise system 110 and not transmitted across network 170.

At 450, the hash value of contents of a clipboard of the first virtual machine is compared with a hash value of contents of a clipboard of the second virtual machine. For example, upon receiving the hash value of the contents of clipboard 123 from remote device 150, virtual machine 130 compares the hash value of the contents of clipboard 123 with the hash value of the contents of clipboard 133 to determine if they are a match or not.

At 460, transmit the hash value to the communication broker from the second virtual machine. For example, in response to the hash value of the contents of clipboard 123 not matching the hash value of the contents of clipboard 133, virtual machine 130 sends the hash value of the contents of clipboard 123 to communication broker 140.

At 470, the communication broker queries for the hash value received from the first virtual machine. For example, communication broker 140 checks to see if the hash value of clipboard 123 (sent from virtual machine 120) is stored at communication broker 140.

At 480, indication is provided to the second virtual machine that the hash value of the item is from the first virtual machine. For example, communication broker 140 indicates that the hash value of the contents of clipboard 123 is associated with virtual machine 120.

At 490, contents of a clipboard of the first virtual machine are requested. For example, in response to communication broker 140 indicating that the contents of clipboard 123 are associated with virtual machine 120, virtual machine 130 requests the contents of clipboard 123 from virtual machine 120.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

Example Host Computer System

Figure 5:
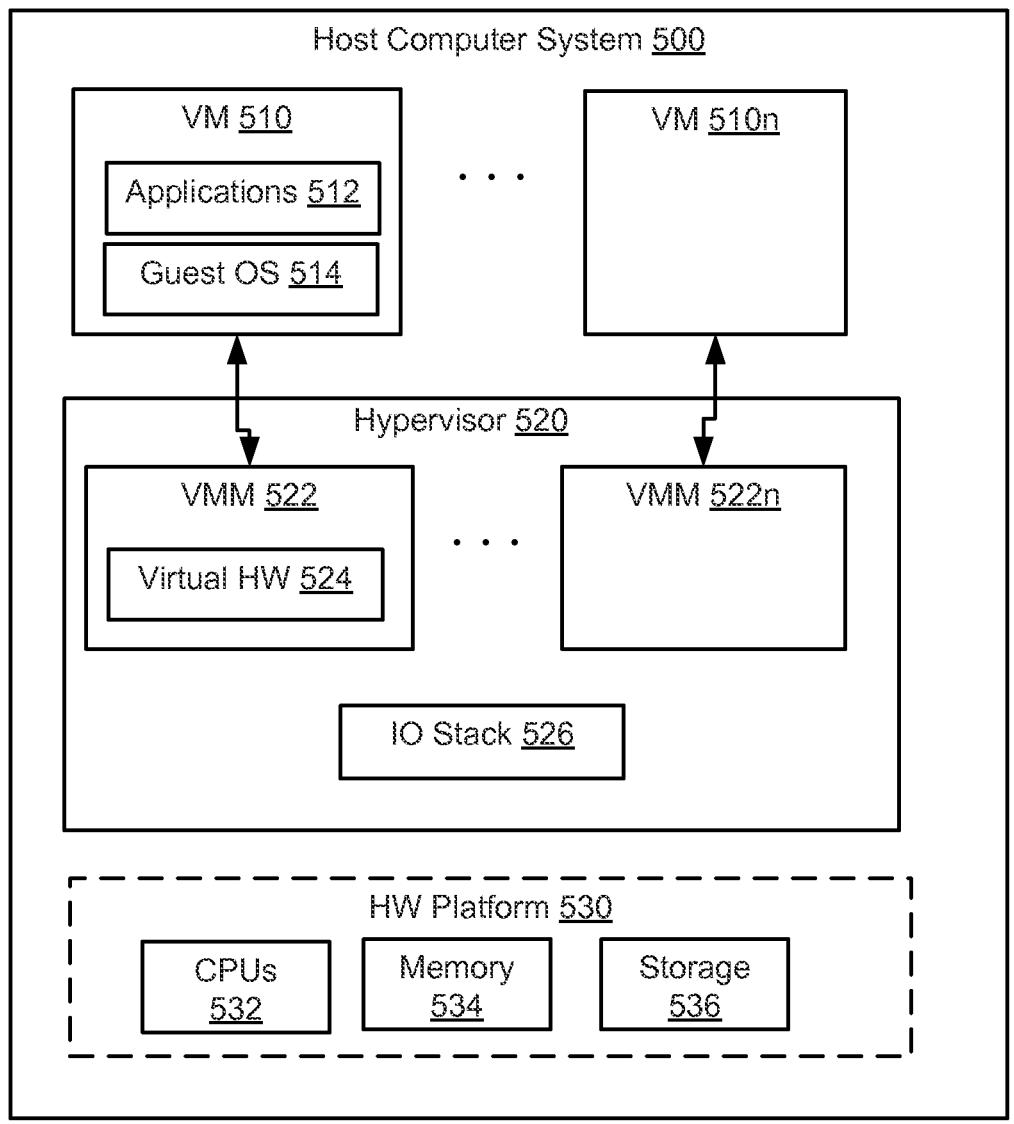
FIG. 5 depicts a block diagram that illustrates an embodiment of a host computing system.

FIG. 5 is a schematic diagram that illustrates a virtualized computer system that is configured to carry out one or more embodiments of the present invention. The virtualized computer system is implemented in a host computer system 500 including hardware platform 530. In one embodiment, host computer system 500 is constructed on a conventional, typically server-class, hardware platform.

Hardware platform 530 includes one or more central processing units (CPUs) 532, system memory 534, and storage 536. Hardware platform 530 may also include one or more network interface controllers (NICs) that connect host computer system 500 to a network, and one or more host bus adapters (HBAs) that connect host computer system 500 to a persistent storage unit.

Hypervisor 520 is installed on top of hardware platform 530 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 524 for virtual machine 510 supports the installation of guest OS 514 which is capable of executing applications 512 within virtual machine 510.

Guest OS 514 may be any of the well-known commodity operating systems, and includes a native file system layer, for example, either an NTFS or an ext3FS type file system layer. IOs issued by guest OS 514 through the native file system layer appear to guest OS 516 as being routed to one or more virtual disks provisioned for virtual machine 510 for final execution, but such 10s are, in reality, are reprocessed by IO stack 526 of hypervisor 520 and the reprocessed 10s are issued, for example, through an HBA to a storage system.

Virtual machine monitor (VMM) 522 and 522n may be considered separate virtualization components between the virtual machines and hypervisor 520 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A computer-implemented method for copying/pasting items in a virtual desktop infrastructure (VDI) environment within an enterprise system using a remote device wherein, in said VDI environment, said remote device accesses said first virtual machine and said second virtual machine over a network, said computer-implemented method comprising:

in response to an ungrab event associated with an item to be copied from said first virtual machine at said first virtual machine, generating a unique identifier of said item;

transmitting said unique identifier to said remote device and a communication broker from said first virtual machine;

receiving said unique identifier at said communication broker;

transmitting an identification of said first virtual machine to said communication broker;

mapping said unique identifier and said identification of said first virtual machine together at said communication broker;

in response to a grab event associated with said item to be pasted to said second virtual machine at said remote device, transmitting said unique identifier to said second virtual machine from said remote device;

transmitting said unique identifier to said communication broker from said second virtual machine;

said communication broker determining if said unique identifier is stored at said communication broker;

when said unique identifier is stored at said communication broker, transmitting said first virtual machine identification corresponding to said first virtual machine to said second virtual machine from said communication broker such that said second virtual machine can request said content from said first virtual machine; and said second virtual machine requesting said item from said first virtual machine;

transmitting said item directly to said second virtual machine from said first virtual machine within said enterprise system without requiring transmission of said item to or from said remote device.

2. The computer-implemented method of claim 1, wherein said generating a unique identifier of an item further comprises:

generating said unique identifier of said item in response to an ungrab event occurring at said remote device.

3. The computer-implemented method of claim 1, wherein said generating a unique identifier of an item further comprises:
generating a hash value of contents of a clipboard of said first virtual machine.

4. The computer-implemented method of claim 1, further comprising:
sending an indication of a grab event of said item and said unique identifier from said remote device to said second virtual machine.

5. The computer-implemented method of claim 1, further comprising:
determining a match between a unique identifier of clipboard data of said first virtual machine and a unique identifier of clipboard data of said second virtual machine, at said second virtual machine.

6. The computer-implemented method of claim 1, further comprising:
requesting contents of a clipboard of said first virtual machine, by said second virtual machine.

7. A non-transitory computer-readable storage medium having instructions embodied therein when executed cause a computer system to perform a method for copying/pasting items in a virtual desktop infrastructure (VDI) environment within an enterprise system at the request of a remote device wherein, in said VDI environment, said remote device accesses said first virtual machine and said second virtual machine over a network, said method comprising:
in response to an ungrab event associated with an item to be copied from a first virtual machine at said remote device, generating a hash value of said item;
transmitting said hash value to said remote device and a communication broker from said first virtual machine;
receiving said hash value at said communication broker;
transmitting the identification of said first virtual machine to said communication broker;
mapping said hash value of said item and said identification of said first virtual machine together at said communication broker;
in response to a grab event associated with a said item to be pasted to a second virtual machine at said remote device, transmitting said hash value to a second virtual machine from said remote device;
transmitting said unique identifier to said communication broker from said second virtual machine;
said communication broker determining if said hash value is stored at said communication broker;
receiving an indication at said second virtual machine, from said communication broker, that said item is located at said first virtual machine;
transmitting first virtual machine identification of said first virtual machine to said second virtual machine from said communication broker such that said second virtual machine can request said content from said first virtual machine;
said second virtual machine requesting said item from said first virtual machine; and
said first virtual machine transmitting said item directly to said second virtual machine, within said enterprise system, such that said item is pasted directly to said second virtual machine from said first virtual machine without requiring transmission of said item to or from said remote device.

8. The non-transitory computer-readable storage medium of claim 7, wherein said hash value is generated at said first virtual machine.

9. The non-transitory computer-readable storage medium of claim 7, wherein said generating a hash value of said item further comprises:
generating a hash value of a contents of a clipboard of said first virtual machine.

10. The non-transitory computer-readable storage medium of claim 7, further comprising:
comparing said hash value of contents of a clipboard of said first virtual machine with a hash value of contents of a clipboard of said second virtual machine.

11. The non-transitory computer-readable storage medium of claim 7, further comprising:
querying said communication broker for said hash value received from said first virtual machine.

12. The non-transitory computer-readable storage medium of claim 7, further comprising:
indicating to said second virtual machine that said hash value of said item is from said first virtual machine.

13. The non-transitory computer-readable storage medium of claim 7, further comprising:
requesting contents of a clipboard of said first virtual machine.

14. A system for copying/pasting items in a virtual desktop infrastructure (VDI) environment within an enterprise system using a remote device, comprising:
a first virtual machine;
a second virtual machine wherein, in said VDI environment, said remote device accesses said first virtual machine and said second virtual machine over a network;
a communication broker; and
one or more processors to perform the functions of;
in response to an ungrab event associated with an item to be copied from said first virtual machine at said remote device, generate a unique identifier of the item at said first virtual machine and transmit said unique identifier of the item to said remote device and said communication broker wherein an identification of said first virtual machine is transmitted to said communication broker;
in response to a grab event associated with said item to be pasted to said second virtual machine at said remote device, transmitting said hash value to a second virtual machine from said remote device;
transmitting said unique identifier to said communication broker from said second virtual machine;
said communication broker determining if said unique identifier is stored at said communication broker;
when said unique identifier is stored at said communication broker, transmitting said identification of said first virtual machine to said second virtual machine from said communication broker such that said second virtual machine can request said content from said first virtual machine; and
pasting said item directly to said second virtual machine from said first virtual machine without requiring transmission of said item to or from said remote device.

15. The system of claim 14, wherein said first virtual machine comprises:
a clipboard, wherein said item is located in said clipboard; and an agent configured to generate a unique identifier of said item located in said clipboard.

* * * * *